US009724547B2

(12) United States Patent
Shepherd et al.

(10) Patent No.: US 9,724,547 B2
(45) Date of Patent: Aug. 8, 2017

(54) STANDING VEHICLE OCCUPANT RESTRAINT SYSTEM

(71) Applicant: Lockheed Martin Corporation, Grand Prairie, TX (US)

(72) Inventors: Patrick E. Shepherd, Mansfield, TX (US); Ricardo Villarreal, Midlothian, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 283 days.

(21) Appl. No.: 13/855,560

(22) Filed: Apr. 2, 2013

(65) Prior Publication Data

US 2014/0232166 A1   Aug. 21, 2014

Related U.S. Application Data

(60) Provisional application No. 61/619,117, filed on Apr. 2, 2012.

(51) Int. Cl.
| A62B 35/04 | (2006.01) |
| A62B 35/00 | (2006.01) |
| B60N 2/42 | (2006.01) |
| B60N 2/24 | (2006.01) |

(52) U.S. Cl.
CPC .......... *A62B 35/0012* (2013.01); *A62B 35/04* (2013.01); *B60N 2/4242* (2013.01); *B60N 2002/247* (2013.01)

(58) Field of Classification Search
CPC .......... B60N 2/42; B60N 2/50; B60N 2/4242; B60N 2002/247; B60R 22/12; A62B 35/04; A62B 35/0012

USPC .............. 296/68.1, 63, 65.02, 65.03, 187.13; 297/470, 471, 472, 473
See application file for complete search history.

(56) References Cited

U.S. PATENT DOCUMENTS

| 3,868,143 | A | * | 2/1975 | Reilly ...................... 297/216.17 |
| 6,705,559 | B1 | * | 3/2004 | Sullivan et al. .............. 242/381 |
| 7,293,818 | B2 | * | 11/2007 | Kumpf ................... B60N 2/015 |
| | | | | 244/122 R |
| 7,815,255 | B1 | * | 10/2010 | Kiel et al. .................. 297/216.1 |
| 8,333,420 | B2 | * | 12/2012 | Mehl et al. ..................... 296/63 |
| 2009/0014991 | A1 | * | 1/2009 | Smyth et al. ................. 280/734 |

(Continued)

*Primary Examiner* — Jason S. Morrow
*Assistant Examiner* — E Turner Hicks
(74) *Attorney, Agent, or Firm* — Terry M. Sanks, Esq.; Beusse Wolter Sanks & Maire, PLLC

(57) ABSTRACT

Presented herein is a restraint system comprising an attachment point configured to attach to a hatch opening of a vehicle, a harness having a seat and a strap attached to the attachment point and to the seat. The harness is configured to accept an occupant and support a portion of the occupant at a position below the hatch opening. The restraint system further comprises an energy absorption mechanism configured to dampen rapid acceleration or deceleration of the occupant. The strap is attached to the attachment point by a quick release mechanism. The energy absorption mechanism may comprise a retraction mechanism having a damper mechanism that is a spring, a coil spring, a viscous fluid, a fluid having a dynamically changeable viscosity or a magnetorheological fluid. The energy absorption mechanism may comprise tear-away sections configured to dampen vehicle motion energy.

17 Claims, 4 Drawing Sheets

(56) References Cited

U.S. PATENT DOCUMENTS

2010/0084907 A1* 4/2010 Greenwood et al. ......... 297/483
2012/0283916 A1* 11/2012 Kranz et al. .................... 701/45

* cited by examiner

STANDING VEHICLE OCCUPANT RESTRAINT SYSTEM

RELATED APPLICATIONS

This application claims the benefit of U.S. Provisional Patent Application Ser. No. 61/619,117, filed on Apr. 2, 2012, and entitled "Standing Vehicle Occupant Restraint System," which is incorporated herein by reference.

TECHNICAL FIELD

The present invention relates generally to a system and method for restraining an occupant of a vehicle.

BACKGROUND

Today, modern combat forces operating in high threat areas have been forced to operate their combat vehicles with open hatches for roof air guards to protect the vehicles. These air guards are operating while standing in the vehicles and are exposed from the waist/mid chest above the roof of the vehicle through air guard hatches (small doors in the roof of the vehicles). They operate with both personal and crew served weapons to protect the vehicle from roof top threats and they observe the areas surrounding the vehicle to prevent up close attacks. These members of the team also assist the driver in locating and avoiding IED's.

The issue with this type of operational concept is that vehicles today have been designed to resist penetration from IEDs and land mines without taking into account for these air guards. The seats in the vehicle are designed to mitigate the energy that is transferred into the vehicle by "stroking" but this system only works for seated passengers and provides no protection to standing service members. This "stroking" is performed when the seat moves and mitigates away and/or dampens the energy utilizing springs or bent wire methods. For those air guards standing in the roof hatches of the vehicle there is little in the way of protection from injury when subjected to a mine or IED blast.

Each person who is standing up in the vehicle is not protected from injuries as a result of mine blast and IED's on the vehicle. This typically results in severe leg, spinal and head injuries. On occasion this also results in personnel being injured and then ejected from the vehicle, sometimes causing fatalities. The US Military is now using gunner restraint systems to prevent service members from being ejected from the vehicle but does not prevent any injuries as a result of energy absorption into the vehicle. These gunner restraint systems are limited in effective usage and in the event of a vehicle fire they can prevent a service member from escaping the vehicle. Due to the design of this system it is very hard for a rescue crew to extract a service member during a vehicle fire. The entire restraint is under the service member and difficult to reach and remove.

In addition the gunner restraint system of the prior art is limited to those who are able to be anchored to the floor of the vehicle. Rear air guards are not able to be anchored to the floor of the vehicle because they are standing in the path of egress for the dismounted section of the vehicle. Thus, the current system fails to address 50% of the possible injuries that can be caused as a result of a mine blast or IED event. It also has a very limited audience/user community because of the anchoring system.

SUMMARY OF THE INVENTION

In some aspects, embodiments of the present invention provide a gunner restraint system and "stroking" system in one simple and inexpensive design while not limiting the combat effectiveness of the position or limiting the egress ability of the crew. This system would prevent the service members from being ejected from the vehicle and prevent and/or minimize the leg and spinal and head injuries caused during these events. This system would be simple enough to allow for rapid egress and adjustability to every vehicle found in the current inventory. The design would also allow for easy extraction from the vehicle. The system would also be applicable to civilian applications, including commercial vehicles, passenger vehicles, and the like. The vehicle itself could be a land vehicle or a watercraft or aircraft, for instance.

A vehicle according to an embodiment may comprise an egress hatch having an opening located on a roof of the vehicle and an occupant restraint system. The restraint system may comprise a harness/seat configured to secure an occupant in a seated position, a G-force dampening mechanism configured to automatically dampen G-forces impacted on the occupant during rapid acceleration or deceleration, and a strap on the end of the harness/seat having a first end connected to the harness/seat and having a second end attached to the G-force damping mechanism. The occupant restraint system may further comprise a mount adjacent a periphery of the opening and configured to secure the strap to the roof via the G-force dampening mechanism, wherein the strap of the harness/seat comprises a quick release mechanism to allow the occupant to exit the vehicle. The quick release mechanism may be configured to disengage the strap from the mount or configured to disengage the mount from the vehicle. The G-force damping mechanism may be configured to release a portion of the strap under tension and mitigate body weight of the occupant during an event and reduce the G-force imparted on the occupant by the event. The G-force damping mechanism may be contained within the harness/seat of the restraint system, and the G-force damping mechanism may be configured to automatically tear away portions of the harness/seat and dampen the G-force imparted on the occupant during an event. The harness/seat may comprise adjustable straps configured to secure the occupant by the waist and legs and allow the occupant to stand up through the opening. The straps are further configured to permit the occupant to sit without adjusting the straps. The harness/seat may comprise pre-defined zones that are configured to absorb energy by deforming or tearing away pre-defined zones when the occupant experiences acceleration or deceleration. The occupant restraint system may be configured to allow an occupant to extend at least partially outside the hatch while being secured without adjustment to the system. The G-force dampening mechanism comprises at least one of a spring, a coil spring, a viscous fluid, a fluid having a dynamically changeable viscosity or a magnetorheological fluid.

A restraint system according to an embodiment comprises a harness with a cushioned seat, a first belt connected to the seat at one end and connected to an anchor at another end, and configured to allow the seat to move throughout a free length of the first belt, and a second belt connected to the seat at one end and connected to a second anchor at another end, and configured to allow the seat to move throughout a free length of the second belt. The restraint system may further comprise a retraction dampening mechanism located at vehicle attachment points of the harness, the retraction dampening mechanism configured to store a portion of a first belt wherein the free length of the first belt is configured to secure an occupant and is configured to be adjusted, the retraction dampening mechanism having a damper configured to resist rapid release of the first belt during times of rapid acceleration or deceleration of the occupant in the seat. The seat may have pre-defined zones that are configured absorb energy when an occupant in the seat experiences rapid acceleration or deceleration. The pre-defined zones may comprise tear-away sections where material integrated into the harness is configured to absorb energy by tearing away from the seat as the occupant travels towards the floor of the vehicle. The pre-defined zones may comprise formable material integrated into the seat and configured to absorb energy by deforming. The retraction mechanism may comprise at least one of a spring, a coil spring, a viscous fluid, a fluid having a dynamically changeable viscosity, or a magnetorheological fluid.

A restraint system according to another embodiment may comprise an attachment point configured to attach to a hatch opening of a vehicle, a harness having a seat and a strap attached to the attachment point and to the seat. The harness is configured to accept an occupant and support a portion of the occupant at a position below the hatch opening. The restraint system further comprises an energy absorption mechanism disposed between the seat and the attachment point, the energy absorption mechanism configured to dampen rapid acceleration or deceleration of the occupant. The strap is attached to the attachment point by a quick release mechanism. The energy absorption mechanism may comprise a retraction mechanism having a damper mechanism configured to damp acceleration or deceleration of the occupant, the damper mechanism comprising one of a spring, a coil spring, a viscous fluid, a fluid having a dynamically changeable viscosity or a magnetorheological fluid. The energy absorption mechanism may comprise tear-away sections configured to dampen vehicle motion energy transferred to the occupant.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A system for a standing occupant of a vehicle to mitigate the energy of a blast or abrupt vehicle motion may have a seat to support the occupant that is attached to the vehicle with an energy absorbing mechanism. A harness is worn by an occupant, and an energy absorbing strap system attaches the harness and user to the vehicle. For example, the restraint system may be a rock climbing harness with an energy absorption seat sewn into it. In other examples, a belt, sling, or the like maybe used to secure the occupant. An energy absorbing mechanism is disposed between the occupant harness and the vehicle, reducing the energy transferred to an occupant of the system by violent movement of the vehicle.

Figure 1:
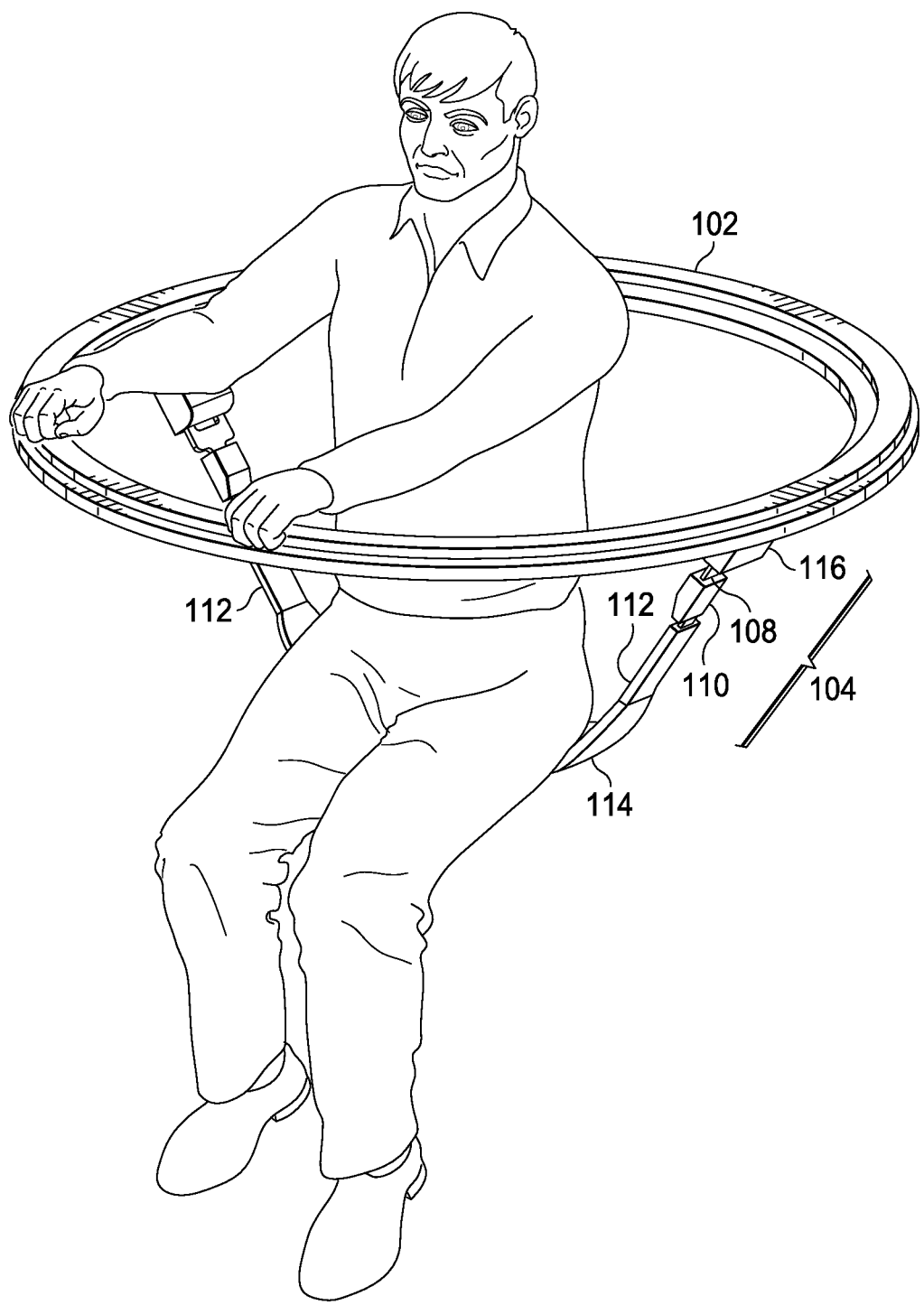
FIG. 1 is a perspective view of an occupant in an embodiment of a restraint system.

Referring now to FIG. 1, a retractable strap energy absorption system is depicted. In an embodiment, a G-Force dampening mechanism provides energy absorption and is a retraction mechanism 116 such as a retraction dampening mechanism that feeds out a belt 108 attached to the harness 104. The retraction mechanism 116 may be configured to have increased resistance to feeding out the belt 108 when the occupants experiences rapid acceleration, such as would be the result of a collision, an explosion, or the like. The harness 104 may also have a belt, and one or more shoulder straps, leg straps or other restraints configured to secure the occupant to the seat, and to the retraction mechanism 116.

The seat 114 is lower than the hatch 102, with the straps 112 of the harness 104 extending upward from the seat 114 to attach to the retraction mechanism 116 by a quick release mechanism 110. The seat 114 being lower than the hatch 102 provides stability for the occupant, and allows the occupant to put his weight on the seat 114 while remaining protected by the energy absorption system.

Figure 2:
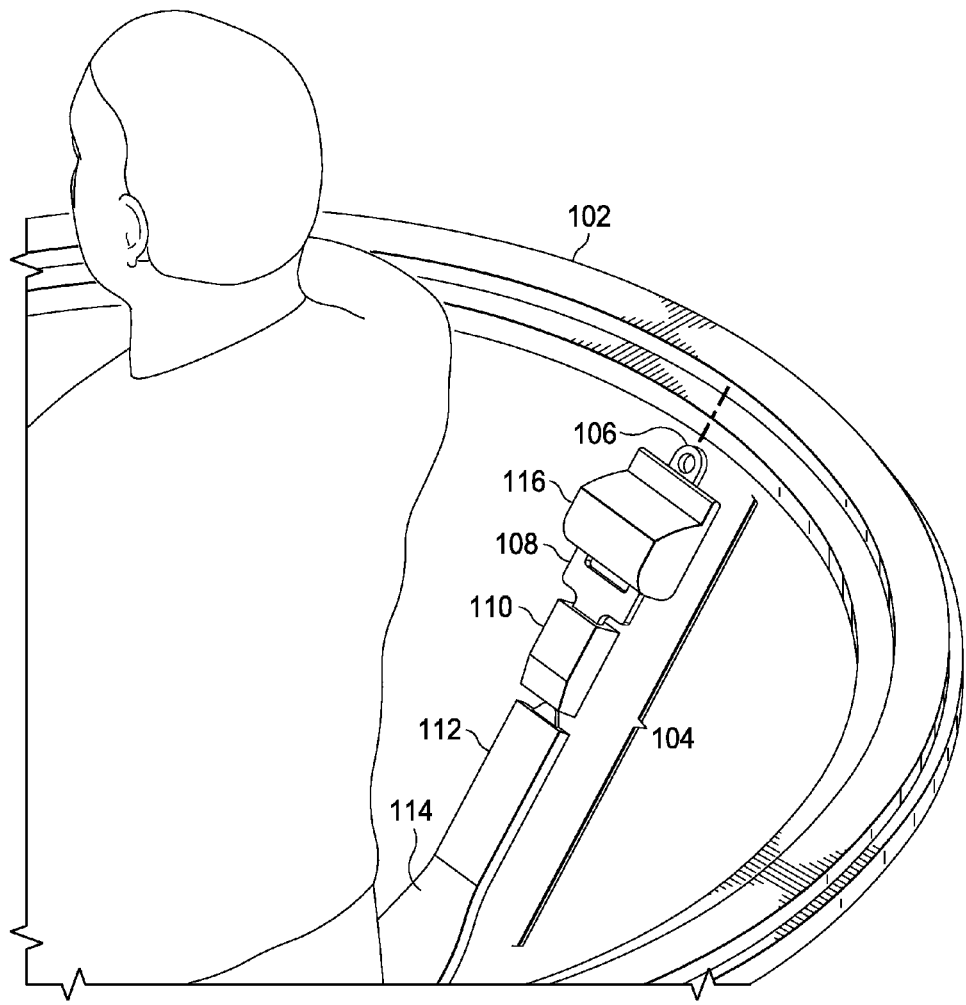
FIG. 2 is a close up of a portion of the restraint system.

FIG. 2 illustrates an exploded view of an embodiment of the restraint system. The harness 104 may have a seat 114 in which an occupant can sit. The seat 114 is secured to the vehicle by way of belts 108 (two are shown, although one belt or more than two belts could be used) which are attached to the vehicle itself. Note that in the illustrated embodiments, the belts 108 are secured to the vehicle near the hatch 102 or other point of entry/egress. The harness 104 may further comprise one or more straps 112 with a quick release mechanism 110 attached to the belts 108 of the retraction mechanism 116. The retraction mechanism 116 may attach to the hatch 102 by a fixed attachment mechanism 106, or may be attached to the hatch 102 by a sliding or pivoting mechanism, permitting the occupant to turn in the hatch 102 without entangling in the straps 112.

This arrangement will facilitate egress from the vehicle, by allowing quick and easy access to the belts 108 securing the occupant. In the event the vehicles hits, e.g., an IED, the vehicle will be propelled upwards initially at great speed and with great G-Force loading on all occupants. The occupant's own inertia will keep the occupant initially stable, meaning that the occupant will rapidly accelerate downwards relative the vehicle, which will be accelerated upwards by the blast. The retraction mechanism 116, such as an illustrated coil spring/damper system allows movement of the occupant downward relative the vehicle (or upward movement of the vehicle relative the occupant), but does so in a manner that dissipates some of the energy associated with the rapid acceleration. This can be accomplished by a system that places a drag or frictional force on the belt 108 as it is released from the retraction mechanism 116, thus absorbing energy and/or slowing rapid acceleration and/or deceleration of the occupant. Various dampers are known, such as a spring, a coil spring, a viscous fluid, a fluid having a dynamically changeable viscosity, a magnetorheological fluid, or the like.

One skilled in the art, i.e. one who understands the effects of these events, will recognize a second impact event will occur when the vehicle slams down after the blast—in which case the occupant is rapidly acceleration upwards relative the vehicle (until the point where again the limit of play in the belt(s) is reached). The retraction mechanism 116 can retract the belt 108 as the vehicle starts the downward trajectory and can then again feed out the belt 108 as the occupant begins moving upwards from his/her initial position, again relative the vehicle. Once again, the retraction mechanism 116 with damper can automatically control and automatically slow the acceleration of the occupant (this time in an upward direction), can absorb energy during this phase, and can lessen the impact of sudden deceleration when the limit of the belt(s) 108 is reached. The illustrated allows the occupant to extend at least partially through the hatch 102 during normal operation, and the system tethers the occupant and prevents the occupant from being ejected from the vehicle during a collision, explosion, or similar event. The restrain system prevents ejection from the vehicle. The system contains straps 112 having a single length connecting the harness 104 to the vehicle, the straps serve as a restraint, limiting the amount of travel which the service member is able to travel above the vehicle.

Finally, gravity will force the occupant back down into the vehicle at the end of the event (after the vehicle has slammed down). Once again the retraction mechanism 116 with damper serves to absorb some of the energy of this trajectory and to limit the suddenness of the deceleration when the occupant "bottoms out." In each phase, the restraint system provides additional protection to the occupant.

This system would also provide rescue operations to be performed much easier than the current systems. The harness 104 will be secured to the sides of the hatch 102 and not under the occupant. This allows for emergency extractions in the case of fire to be performed much easier and quicker. A simple cutting tool can be used by a rescue person while standing on the roof of the vehicle.

This solution not only prevents ejection from the vehicle but also provides mitigation from mine/IED events as well as easy egress/rescue operations. This solution works in conjunction with the vehicles armor protection systems by providing effects mitigation capabilities to the standing air guards and gunners in the combat vehicles. This system is very low cost and simple to use. It would be able to account for variations in weight, size and vehicle deltas without any need for redesign.

In addition this restraint system is not limited to those who are able to be anchored to the floor of the vehicle. Rear air guards are not able to be anchored to the floor of the vehicle because they are standing in the path of egress for the dismounted section of the vehicle. Thus, the current system fails to address 50% of the possible injuries that can be caused as a result of a mine blast or IED event. The current system also has a very limited audience/user community because of the anchoring system.

Figure 3:
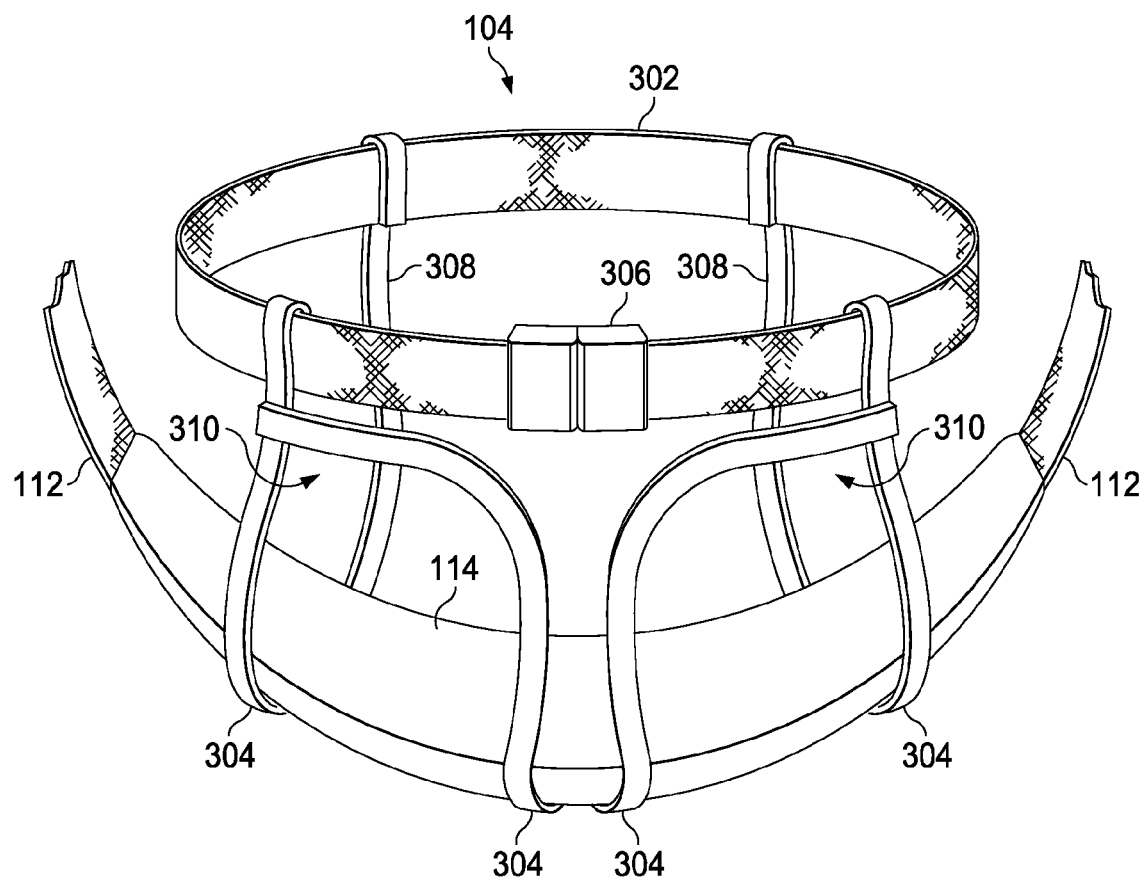
FIG. 3 is an embodiment of a harness of the restraint system.

FIG. 3 illustrates a front view of an embodiment of a harness 104 for the energy absorption restraint system. The harness 104 has a seat 114 affixed to the straps 112, which are in turn attached to the retraction mechanism 116 (FIGS. 1 and 2). In this embodiment, the straps 112 form a sling style seating area with the seat 114. An occupant belt 302 may be attached to the seat 114 by one or more rear straps 308, and/or one or more leg straps 304. The occupant belt 302 may have a buckle 306 or other closure to secure the occupant to the seat 114, and in turn, to the hatch 102 (FIGS. 1 and 2).

The leg straps 304 may be arranged to form a leg opening 310. The rear straps 308 may be arranged to prevent an occupant from sliding off the rear edge of the seat 114, and the leg straps 304 disposed on the opposite side of the seat 114 are arranged to prevent the occupant from "submarining", or sliding off the front edge of the seat 114.

Figure 4:
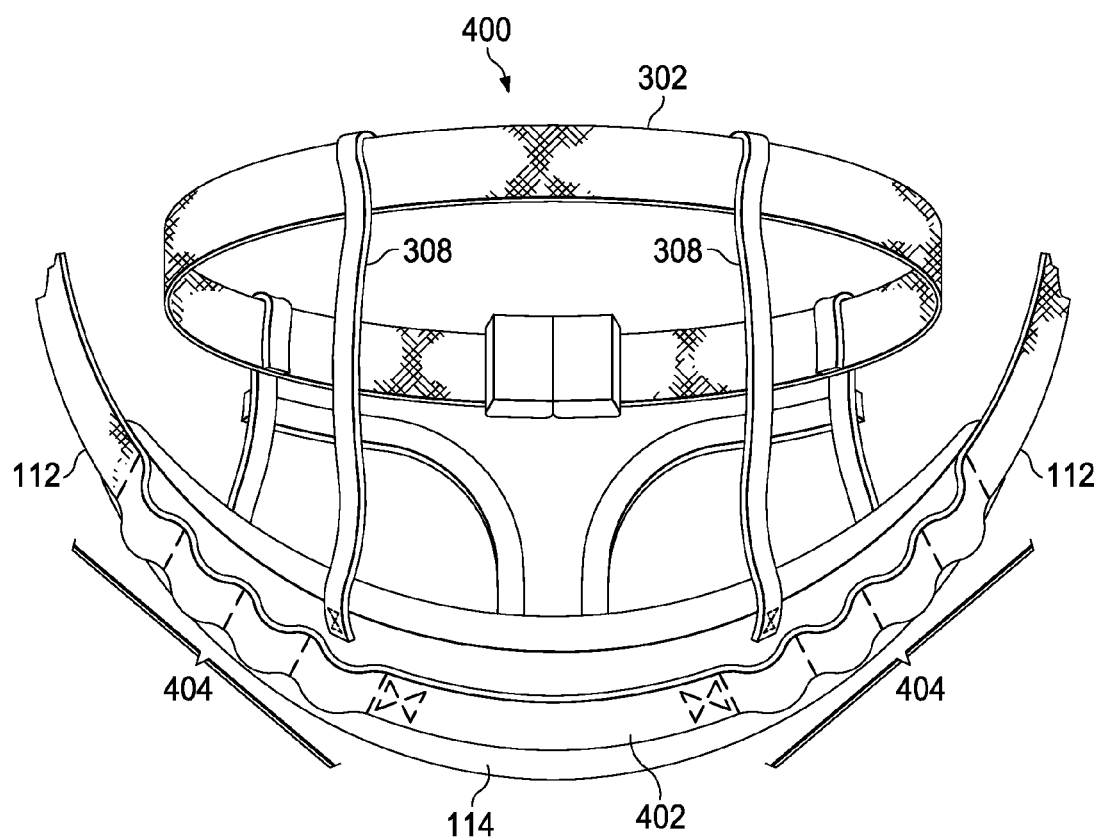
FIG. 4 is an embodiment of a restraint system with a tear-away section.

FIG. 4 illustrates a rear view of an embodiment of the deformable energy absorption restraint system. The system may have a G-Force dampening mechanism comprising one or more pre-defined zones that are configured to absorb energy when an occupant in the harness 104 experiences rapid acceleration or deceleration. In an embodiment, the pre-defined zones may be tear-away sections 404 where material forming the harness 104 or attaching the harness 104 to the straps 112 is a relatively weak material compared to the material of the seat 114 not in the tear-away sections 404. In another embodiment, the pre-defined zones may comprise formable material forming the seat 114 or otherwise integrated into the seat 114 and configured to absorb energy by deforming. For example, the seat may be a deformable material such as an elastic or elastomer material that stretches under stress. In another example, the straps 112 may be attached to the seat 114 at a tear-away section 404 where the straps 112 partially detach from the seat 114 under stress.

In this embodiment, the system will rip as it mitigates the motion energy transferred to the occupant, a onetime use system. The straps 112 are attached to the seat 114 in two sections, with tear-away sections 404 for energy mitigation and a fixed attachment section 402 permanently attaching the straps 112 to the seat 114. The free ends of the straps 112 may be attached to the hatch 102 (FIGS. 1 and 2) or the vehicle by a quick release mechanism 110 (FIGS. 1 and 2).

The seat 114 section of the system will be one section of high strength harness material that is sewn into the seat 114. The harness 104 materials in the tear-away sections 404 may have heavy sewing on the peak of each loop and light sewing along the tear path. The tear path may be where the loops of the harness 104 in the tear-away section 404 attach to the seat 114. This would allow the tearing to occur at a controlled manner. As the loops of the tear-away section 404 tear from the harness seat 114 they will reduce the amount of energy which the occupant experiences.

This ripping action will mitigate the energy over several feet and due to the simplistic design, and may be attached so that the occupant weight is not a factor. The energy absorption seat 114 may be built to cover the entire backside section of the harness 104 and act as a seat for the service member when performing everyday operations. This seated position would limit the amount of time the occupant would be standing and thus reduce the amount of lower body, back and muscle strain.

The tear-away section 404 may, in an embodiment, have each loop attached with stitching sufficient to support an occupant's weight, but to tear-away at a predetermined force. For example, the tear-away section 404 on each side may have each loop sewn to the seat 114 with an arrangement able to withstand 200 pounds of force for each tearing section. Thus, the harness 104 can support a total of 400 pounds of force for every pair of torn away sections. An explosion, collision, or other abrupt motion event may separate or tear pairs of the tear-away section 404 sewn loop sections away from the harness 104, until the force on the occupant is mitigated below the threshold required to tear-away the tear-away section 404. The system will have multiple tear-away sections 404 on each side of the seat to account for variable weight, blast levels and irregular standing positions during the moment of the "event."

While the tear-away section 404 is described as having strap 112 portions attached to the seat 114 with sewn portions, alternative arrangements may be employed. For example, the tear-away section 404 may be attached to the seat 114 with hook-and-loop material, an adhesive, snaps, or a like system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A vehicle comprising:
   an egress hatch having an opening located on a roof of the vehicle; and
   an occupant restraint system comprising:
      a harness comprising an elastic seat configured to secure an occupant in a seated position and stretch under stress and a strap extending along an underside of the seat with free ends of the strap extending from opposite sides of the seat; and
      a G-force dampening mechanism contained within the strap and comprising tear-away sections, attached along tear paths to an underside of the elastic seat, configured to automatically tear away from the seat to dampen the G-forces imparted on the occupant in the seated position during rapid acceleration or deceleration; and
      the free ends of the strap of the harness adapted to be coupled to the egress hatch.

2. The vehicle of claim 1, the occupant restraint system further comprising a mount adjacent a periphery of the opening and configured to secure the free ends of the strap, having the G-force dampening mechanism to the vehicle, wherein the strap of the harness comprises a quick release mechanism to allow the occupant to exit the vehicle.

3. The vehicle of claim 2, wherein the quick release mechanism is configured to disengage the strap from the mount.

4. The vehicle of claim 2, wherein the quick release mechanism is configured to disengage the mount from the vehicle.

5. The vehicle of claim 1, wherein the G-force damping mechanism further comprising a retraction mechanism coupled to the vehicle and including a belt coupled to a free end of the strap, the retraction mechanism is configured to release a portion of the belt under tension to mitigate body weight of the occupant during the rapid acceleration or deceleration and reduce the G-force imparted on the occupant by the rapid acceleration or deceleration.

6. The vehicle of claim 1, wherein the harness comprises adjustable straps configured to secure the occupant by the waist and legs to the seat and allow the occupant to stand up through the opening, wherein the adjustable straps are further configured to permit the occupant to sit without adjusting the adjustable straps.

7. The vehicle of claim 1, wherein the occupant restraint system is configured to allow an occupant to extend at least partially outside the hatch while being secured without adjustment to the system.

8. The vehicle of claim 1, wherein the retraction mechanism further comprises at least one of a spring, a coil spring, a viscous fluid, a fluid having a dynamically changeable viscosity or a magnetorheological fluid.

9. A restraint system comprising:
   a harness with a cushioned seat and a strap extending along an underside of the seat such that free ends of the strap extend from opposite sides of the seat;
   a first belt connected at one end to a first free end of the strap coupled to the seat and connected to an anchor at another end of the first belt, and configured to allow the seat to move throughout a free length of the first belt;
   a second belt connected at one end to a second free end of the strap extending from another side of the seat and connected to a second anchor at another end of the second belt, and configured to allow the seat to move throughout a free length of the second belt; and
   a G-force dampening mechanism comprising a retraction dampening mechanism located at vehicle attachment points of the harness, the retraction dampening mechanism configured to store a portion of a first belt wherein the free length of the first belt is configured to secure the seat to the vehicle and is configured to be adjusted, the retraction dampening mechanism having a damper configured to resist rapid release of the first belt during times of rapid acceleration or deceleration of the occupant in the seat; and wherein the G-force dampening mechanism further comprising tear-away sections integrated into the strap at locations along the underside of the seat, the tear-away sections being attached along tear paths to and under the seat to automatically tear away from the seat to dampen a G-force imparted on the occupant during the times of the rapid acceleration or deceleration.

10. The system of claim 9, wherein the tear-away sections are configured to absorb energy by tearing away from the underside of the seat as the occupant travels towards the floor of the vehicle.

11. The system of claim 9, wherein the seat is formed from elastic material configured to absorb energy by stretching under stress.

12. The system of claim 9, wherein the damper comprises at least one of a spring, a coil spring, a viscous fluid, a fluid having a dynamically changeable viscosity, or a magnetorheological fluid.

13. A restraint system comprising:
   an attachment point configured to attach to a hatch opening of a vehicle;
   a harness having an elastic seat to stretch under stress and configured to accept an occupant and support a first portion of the occupant at a position below the hatch opening and a second portion above the hatch opening, the harness further having a strap extending along an underside of the elastic seat with free ends of the strap extending from opposite sides of the elastic seat wherein a respective one free end configured to attach to the attachment point and the strap being attached to and along the underside of the elastic seat; and
   an energy absorption mechanism including a belt disposed between the elastic seat and the attachment point, the energy absorption mechanism secures the strap attached to the elastic seat to the attachment point and resists rapid release of the belt during times of rapid acceleration or deceleration of the occupant in the elastic seat to dampen the rapid acceleration or deceleration of the occupant.

14. The restraint system of claim 13, wherein the strap is attached to the attachment point by a quick release mechanism.

15. The restraint system of claim 13, wherein the energy absorption mechanism comprises a retraction mechanism to resist the rapid release of the belt to automatically control the acceleration or deceleration of the occupant in the harness and mitigate G-forces on the occupant.

16. The restraint system of claim 15, wherein the retraction mechanism comprises a damper mechanism configured to damp the acceleration or deceleration of the occupant, the damper mechanism comprising one of a spring, a coil spring, a viscous fluid, a fluid having a dynamically changeable viscosity or a magnetorheological fluid.

17. The restraint system of claim 13, wherein the energy absorption mechanism comprises tear-away sections integrated into a portion of the strap extending along the underside of the elastic seat and configured to dampen vehicle motion energy transferred to the occupant wherein the tear-away sections are attached along tear paths at locations along the underside of the elastic seat.

* * * * *

UNITED STATES PATENT AND TRADEMARK OFFICE
CERTIFICATE OF CORRECTION

PATENT NO.         : 9,724,547 B2                                       Page 1 of 1
APPLICATION NO.    : 13/855560
DATED              : August 8, 2017
INVENTOR(S)        : Patrick E. Shepherd and Ricardo Villarreal It is certified that error appears in the above-identified patent and that said Letters Patent is hereby corrected as shown below:

In the Claims

Column 7, Claim 1, Line 28, delete "G-forces" and insert --G-force--.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*